United States Patent
Maria

(10) Patent No.: US 9,125,060 B2
(45) Date of Patent: Sep. 1, 2015

(54) METHODS, SYSTEMS, AND COMPUTER PROGRAM PRODUCTS FOR INTERCEPTING, IN A CARRIER NETWORK, DATA DESTINED FOR A MOBILE DEVICE TO DETERMINE PATTERNS IN THE DATA

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 14/088,114

(22) Filed: Nov. 22, 2013

(65) Prior Publication Data

US 2015/0150083 A1     May 28, 2015

(51) Int. Cl.
*H04L 29/06*     (2006.01)
*H04W 12/08*     (2009.01)
*H04L 12/58*     (2006.01)

(52) U.S. Cl.
CPC ............... *H04W 12/08* (2013.01); *H04L 51/12* (2013.01); *H04L 63/306* (2013.01)

(58) Field of Classification Search
CPC ...... H04W 12/08; H04L 51/12; H04L 63/306
USPC ........................................................... 726/3
See application file for complete search history.

(56) References Cited

U.S. PATENT DOCUMENTS

| 6,785,732 | B1 * | 8/2004 | Bates et al. ............... 709/232 |
| 7,103,772 | B2 | 9/2006 | Jorgensen et al. |
| 7,386,297 | B2 * | 6/2008 | An ............................. 455/410 |
| 7,496,348 | B2 * | 2/2009 | Srey et al. .................. 455/410 |
| 7,716,739 | B1 * | 5/2010 | McCorkendale ............ 726/23 |
| 7,827,597 | B2 | 11/2010 | Boynton et al. |
| 7,865,944 | B1 * | 1/2011 | Shu et al. ..................... 726/11 |
| 7,945,955 | B2 * | 5/2011 | Katkar ........................ 726/22 |
| 8,225,215 | B2 | 7/2012 | Oswalt |
| 8,239,945 | B2 | 8/2012 | Boulanger et al. |
| 8,365,252 | B2 * | 1/2013 | Mahaffey et al. ............ 726/3 |

(Continued)

FOREIGN PATENT DOCUMENTS

| CN | 102888996 | 1/2013 |
| EP | 2188696 A1 | 5/2010 |

(Continued)

OTHER PUBLICATIONS

BoxTone, Enterprise Mobile Device Data Collection and Analysis Platform with SmartMP, "BoxTone Core Platform: Scalable, Secure End-to-End Data Collection and Analysis Platform with Real-Time Automation Technology to Automatically Monitor, Analyze and Control Diverse Mobile Environments", Copyright date: 2012, Retrieved from Internet: http://www.boxtone.com/products/boxtone-core-platform.aspx on Aug. 22, 2013, 2 pages.

*Primary Examiner* — Michael S McNally

(74) *Attorney, Agent, or Firm* — Akerman LLP; Michael K. Dixon; Roy P. Zachariah

(57) ABSTRACT

A method includes intercepting, in a carrier network, data communicated from a sending entity and destined for a mobile device, comparing the data that has been intercepted with a data pattern to determine whether the data that has been intercepted matches the data pattern, and blocking the data that has been intercepted from reaching the mobile device when the data that has been intercepted matches the data pattern.

20 Claims, 4 Drawing Sheets

(56) References Cited

U.S. PATENT DOCUMENTS

| | | | |
|---|---|---|---|
| 8,370,274 B2 | 2/2013 | Cassetti et al. | |
| 8,397,301 B2 * | 3/2013 | Hering et al. | 726/25 |
| 8,495,700 B2 | 7/2013 | Shahbazi | |
| 8,898,789 B2 * | 11/2014 | Shanley | 726/24 |
| 8,984,628 B2 * | 3/2015 | Mahaffey et al. | 726/22 |
| 2002/0194498 A1 * | 12/2002 | Blight et al. | 713/201 |
| 2003/0162575 A1 * | 8/2003 | Morota et al. | 455/575 |
| 2003/0182559 A1 * | 9/2003 | Curry et al. | 713/189 |
| 2007/0094374 A1 | 4/2007 | Karia et al. | |
| 2007/0240217 A1 * | 10/2007 | Tuvell et al. | 726/24 |
| 2008/0070495 A1 | 3/2008 | Stricklen et al. | |
| 2008/0086776 A1 * | 4/2008 | Tuvell et al. | 726/24 |
| 2008/0196104 A1 * | 8/2008 | Tuvell et al. | 726/24 |
| 2009/0049518 A1 | 2/2009 | Roman et al. | |
| 2009/0210936 A1 | 8/2009 | Omar et al. | |
| 2010/0287613 A1 * | 11/2010 | Singh et al. | 726/22 |
| 2012/0233656 A1 | 9/2012 | Rieschick et al. | |
| 2013/0133067 A1 | 5/2013 | Yoo | |
| 2013/0205020 A1 | 8/2013 | Broda et al. | |
| 2013/0347094 A1 * | 12/2013 | Bettini et al. | 726/11 |

FOREIGN PATENT DOCUMENTS

| | | |
|---|---|---|
| EP | 2321736 A1 | 5/2011 |
| WO | WO 2009056148 | 5/2009 |

\* cited by examiner

METHODS, SYSTEMS, AND COMPUTER PROGRAM PRODUCTS FOR INTERCEPTING, IN A CARRIER NETWORK, DATA DESTINED FOR A MOBILE DEVICE TO DETERMINE PATTERNS IN THE DATA

BACKGROUND

The present disclosure relates generally to computer system and network security and, more particularly, to methods, systems, computer program products for an enterprise to manage access to its data via mobile devices.

An enterprise's data is one of the most sensitive and valuable resources belonging to the enterprise. To protect the data that is went, received, and stored on mobile devices, various device management solutions have been developed. These solutions typically rely on products that rely on software clients that reside on the device to manage, encrypt, containerize, and protect mobile data stored on the device. For example, some products rely on a client that is downloaded to the mobile device, which receives configuration information from a server residing in the enterprise that also acts as a firewall for the mobile device. Other products use the container approach, which means that the only way to access enterprise data is through an application residing on a device, which communicates with an associated application residing on an enterprise server. Whether a client based approach is used or a container based approach is used, neither of these solutions involve the carrier network over which the enterprise data is communicated to the mobile device.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method comprising: intercepting, in a carrier network, data communicated from a sending entity and destined for a mobile device, comparing the data that has been intercepted with a data pattern to determine whether the data that has been intercepted matches the data pattern, and blocking the data that has been intercepted from reaching the mobile device when the data that has been intercepted matches the data pattern.

In other embodiments, the method further comprises: quarantining the data that has been intercepted for a defined time period when the data that has been intercepted matches the data pattern.

In still other embodiments, the data that has been intercepted comprises first data and the method further comprises: generating second data based on the first data and sending the second data to the mobile device.

In still other embodiments, generating the second data comprises: changing the first data in a pre-defined way associated with the data pattern.

In still other embodiments, the second data comprises a pre-defined response that is associated with the data pattern.

In still other embodiments, the method further comprises: notifying the sending entity that the data that has been intercepted has been blocked from reaching the mobile device.

In still other embodiments, notifying the sending entity comprises: sending a short message service message to a security administrator associated with the sending entity.

In still further embodiments, the short message service message comprises a portion of the data that has been intercepted.

In still other embodiments, notifying the sending entity comprises: sending voice over Internet Protocol packets to a security administrator associated with the sending entity.

In still other embodiments, the voice over Internet Protocol packets comprises a portion of the data that has been intercepted.

In still other embodiments, the method further comprises: modifying the data pattern responsive to action taken by the sending entity responsive to the sending entity being notified that the data that has been intercepted has been blocked from reaching the mobile device.

In still other embodiments, the method further comprises: generating the data pattern responsive to input from the sending entity.

Further embodiments provide a system, comprising a processor and a memory coupled to the processor and comprising computer readable program code embodied in the memory that when executed by the processor causes the processor to perform operations. The operations comprise intercepting, in a carrier network, data communicated from a sending entity and destined for a mobile device, comparing the data that has been intercepted with a data pattern to determine whether the data that has been intercepted matches the data pattern, and blocking the data that has been intercepted from reaching the mobile device when the data that has been intercepted matches the data pattern.

In still further embodiments, the operations further comprise: quarantining the data that has been intercepted for a defined time period when the data that has been intercepted matches the data pattern.

In still further embodiments, the data that has been intercepted comprises first data and the operations further comprise: generating second data based on the first data and sending the second data to the mobile device.

In still further embodiments, the operations further comprise: notifying the sending entity that the data that has been intercepted has been blocked from reaching the mobile device.

Other embodiments provide an article of manufacture, comprising a tangible computer readable storage medium, which comprises computer readable program code embodied in the medium that when executed by a processor causes the processor to perform operations comprising: intercepting, in a carrier network, data communicated from a sending entity and destined for a mobile device, comparing the data that has been intercepted with a data pattern to determine whether the data that has been intercepted matches the data pattern, and blocking the data that has been intercepted from reaching the mobile device when the data that has been intercepted matches the data pattern.

In still other embodiments, the operations further comprise: quarantining the data that has been intercepted for a defined time period when the data that has been intercepted matches the data pattern.

In still other embodiments, the data that has been intercepted comprises first data and the operations further comprise: generating second data based on the first data and sending the second data to the mobile device.

In still other embodiments, the operations further comprise: notifying the sending entity that the data that has been intercepted has been blocked from reaching the mobile device Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
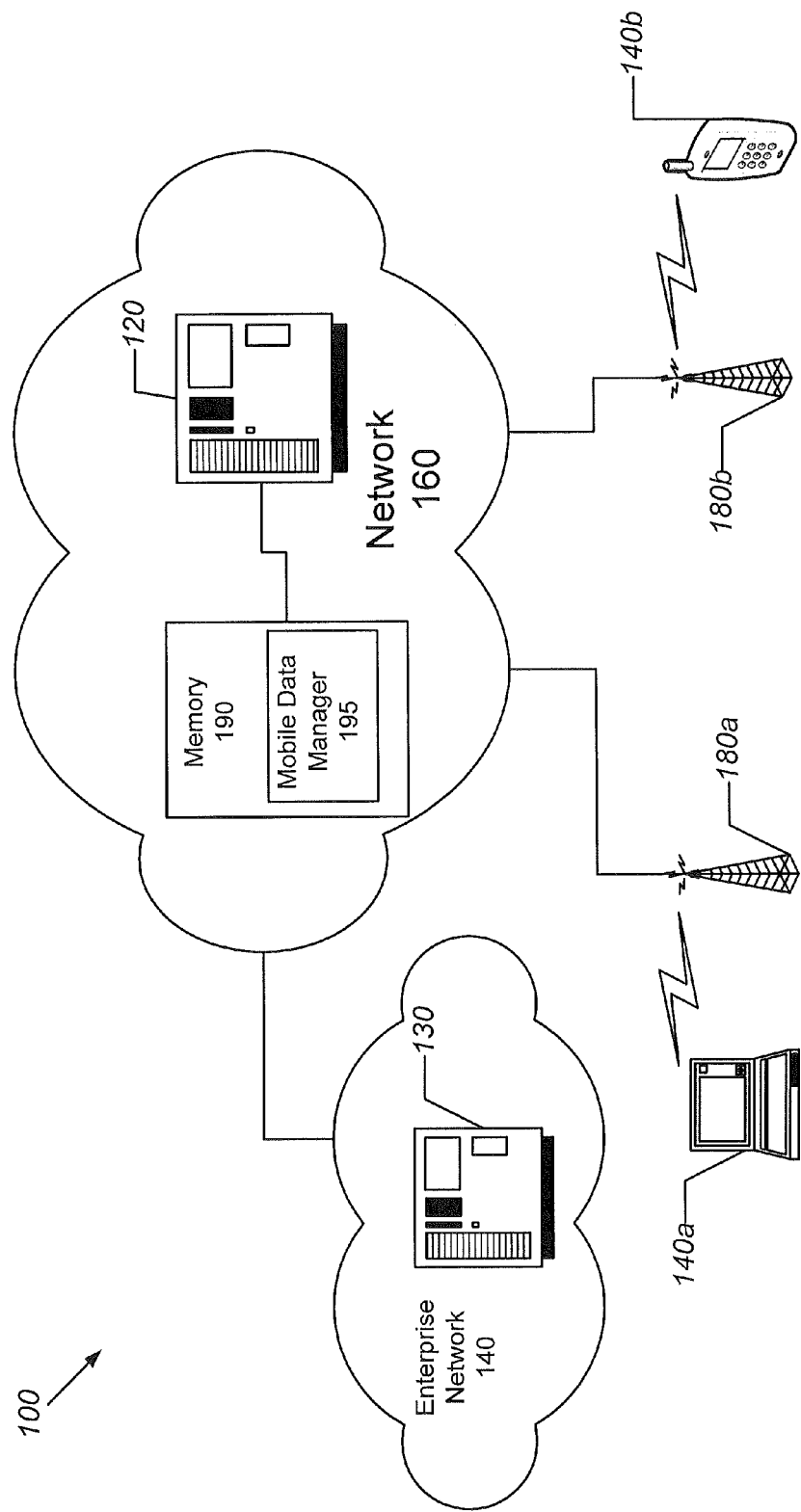
FIG. 1 is a block diagram of a communication network that includes a Mobile Data Management Intelligent Processor (MDM-IP) in the carrier network according to some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, microcode, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile devices may also be referred to as "pervasive computing" devices.

As used herein, the term "carrier network" refers to the proprietary network infrastructure belonging to a telecommunication service provider, such as, for example, AT&T. Telecommunication service providers are authorized to operate their carrier networks by regulatory agencies. Specific device types serviced by a carrier network include, but are not limited to, telephony equipment, community access television receivers, satellite television receivers, mobile computing devices, personal computers, laptop computers, tablet computers, medical equipment, surveillance equipment, and the like. The long-distance signal-conveying medium and equipment in a carrier network may be called the network backbone.

Some embodiments described herein stem from a realization that a carrier network operator is in a unique position to manage, restrict, and encrypt data as it traverses through the core or backbone data network. In some embodiments, a Mobile Data Management Intelligent Processor (MDM-IP) may be included in a carrier network and used to intercept and inspect data as it is sent from an enterprise to a mobile device. In particular, the data may be intercepted and compared to one or more pre-defined data patterns. If the data is found to match one or more of the patterns, then the MDM-IP may take one or more actions, including, but not limited to, quarantining the data, modifying the data (modifying a portion of the data or substituting different data, i.e., a different message), notifying the enterprise, and the like. In accordance with various embodiments, the enterprise can be notified using a Short Message Service (SMS) message and/or Voice over Internet Protocol (VoIP) packets that may also include a portion or all of the intercepted data.

Referring now to FIG. 1, a communication network 100 includes an MDM-IP 120 that is configured to intercept and inspect data as it is sent from an enterprise server 130 in an enterprise network 140 to one or more mobile devices 140a and 140b. In particular, as shown in FIG. 1, the mobile devices 140a and 140b communicate with the enterprise server 130 over a carrier network 160. The carrier network 160 may represent a global network, such as the Internet, or other publicly accessible network. Furthermore, the carrier network 160 may represent a combination of public and private networks, such as a wide area network, local area network, Intranet, virtual private network (VPN), and/or other private network. The carrier network 160 includes wireless base station transceivers 180a and 180b that may facilitate wireless communication with the mobile devices 140a and 140b. Although only two mobile devices 140a and 140b are shown, it will be understood that the carrier network may support large numbers of mobile devices according to some embodiments.

Figure 2:
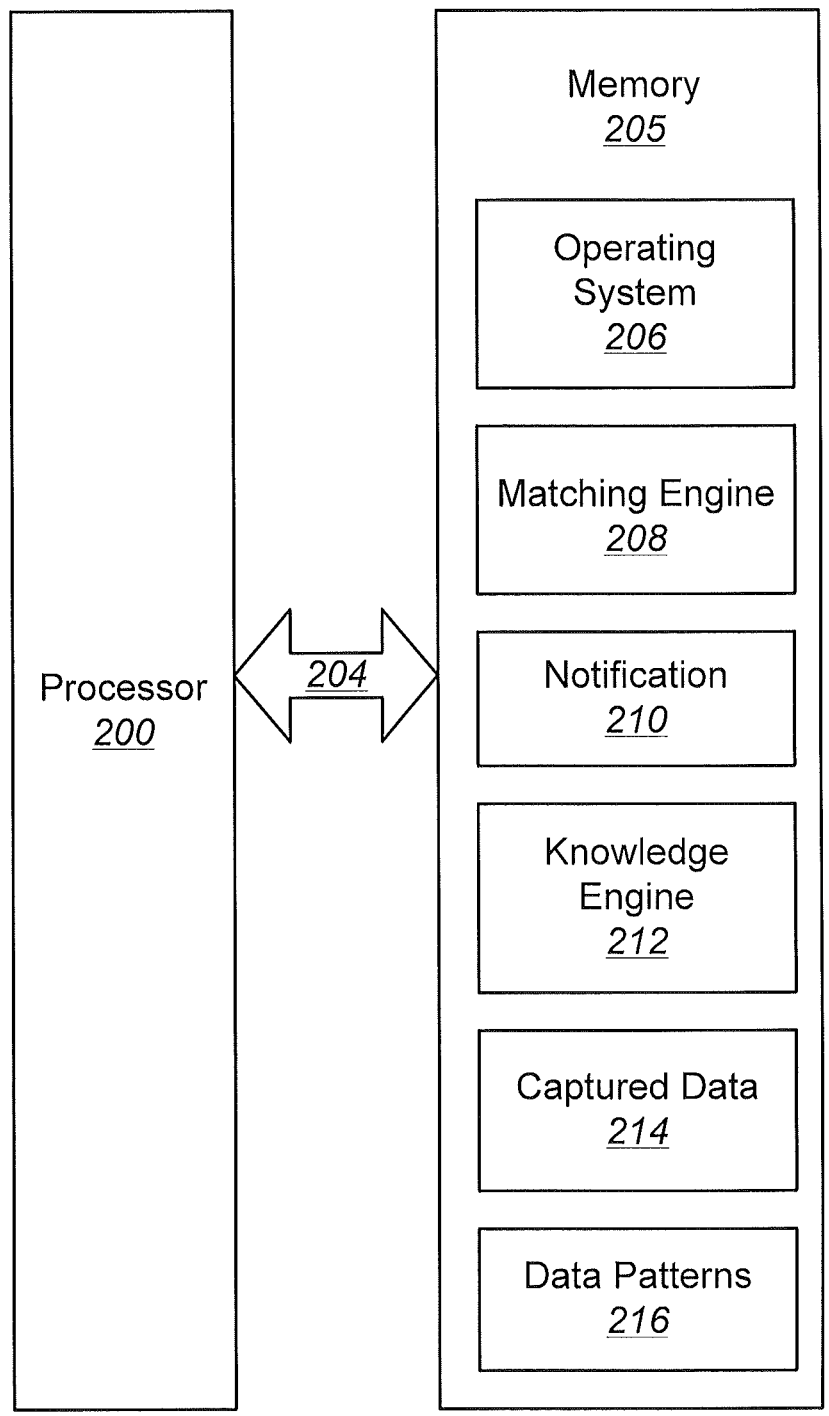
FIG. 2 is a block diagram that illustrates a software/hardware architecture for the MDM-IP according to some embodiments

The authentication server 120 is equipped with a memory 190 that is representative of the one or more memory devices containing the software and data used to intercept and inspect data as it is sent from the enterprise server 130 to the mobile devices 140a and 140b. The memory 190 may include, but is not limited to, the following types of devices: cache, ROM, PROM, EPROM, EEPROM, flash, SRAM, and DRAM. As shown in FIG. 2, the memory 190 may contain a mobile data manager module 195 that is configured to intercept data communicated from the enterprise server 130 and destined for one of the mobile devices 180a, 180b, compare the data that has been intercepted with one or more pre-defined data patterns to determine whether there is a match, and to block the data that has been intercepted from reaching the mobile device 180a, 180b that was the intended destination.

It will be appreciated that in accordance with various embodiments, each of the enterprise server 130 and the MDM-IP 120 may be implemented as a single server, separate servers, or a network of servers either co-located in a server farm, for example, or located in different geographic regions.

Although FIG. 1 illustrates an exemplary communication network and an exemplary hardware/software architecture that may be used in a data processing system, such as the MDM-IP 120, for intercepting and inspecting data as it is sent from an enterprise server 130 in an enterprise network 140 to one or more mobile devices 140a and 140b through a carrier network 160, it will be understood that embodiments of the present invention are not limited to such a configuration but are intended to encompass any configuration capable of carrying out operations described herein.

FIG. 2 illustrates a processor 200 and memory 205 that may be used in embodiments of a data processing system, such as the MDM-IP 120 of FIG. 1, for implementing various functionality of the MDM-IP 120 in accordance with some embodiments. The processor 200 communicates with the memory 205 via an address/data bus 204. The processor 200 may be, for example, a commercially available or custom microprocessor. The memory 205 is representative of the one or more memory devices containing the software and data used to intercept and inspect data as it is sent from an enterprise server in an enterprise network to one or more mobile devices through a carrier network in accordance with some embodiments. The memory 205 may include, but is not limited to, the following types of devices: cache, ROM, PROM, EPROM, EEPROM, flash, SRAM, and DRAM.

As shown in FIG. 2, the memory 205 may contain six or more categories of software and/or data: an operating system 206, a matching engine module 208, a notification module 210, a knowledge engine module 212, captured data 214, and data patterns 216. The operating system 206 generally controls the operation of the data processing system. In particular, the operating system 206 may manage the data processing system's software and/or hardware resources and may coordinate execution of programs by the processor 200.

The matching engine 208 may intercept data sent from the enterprise server 130 to a mobile device 140a, 140b in real time as the data is passing through the carrier network 160. The intercepted data is stored in the captured data module 214 for a period of time in accordance with the preferences of the sending entity (e.g., the enterprise customer) and compared with one or more pre-defined data patterns 216. In accordance with some embodiments, the operator of the carrier network 160 may provide one or more of the pre-defined data patterns 216 to identify potential types of data that an enterprise would not want to be accessed using a mobile device. The operator of the carrier network 160 may also allow the enterprise customer to define one or more of the pre-defined data patterns 216 that the customer wishes to detect. The matching engine module 208 compares the intercepted data that is stored in the captured data module 214 with the one or more pre-defined data patterns 216 to determine if there is a match. As described in further detail hereafter, the matching engine may take various types of actions if there is a match between the intercepted data and one or more of the data patterns 216 including, but not limited to, blocking the intercepted data from reaching the mobile device that was the intended destination for the intercepted data, quarantining the intercepted data, generating new data for the mobile device, notifying the data sending entity (i.e., the enterprise customer), and modifying one or more of the existing data patterns or generating new data patterns based on input and/or observed behavior of the data sending entity.

The notification module 210 may notify the sending entity (i.e., the enterprise customer) when there has been a match between the intercepted data and one or more of the pre-defined data patterns 216 and the intercepted data has been blocked from reaching the destination mobile device.

The knowledge engine module 212 may update the pre-defined data patterns 216 and/or add generate new data patterns 216 based on input from the sending entity (e.g., the enterprise customer) and/or based on observing actions taken by the sending entity in response to being notified that certain intercepted data has been blocked in the carrier network due to a match with one or more pre-defined data patterns 216.

Although FIG. 2 illustrates an exemplary hardware/software architecture that may be used in data processing systems, such as the MDM-IP 120 of FIG. 1, for implementing various functionality of the MDM-IP 120 in accordance with some embodiments, it will be understood that the present invention is not limited to such a configuration but is intended to encompass any configuration capable of carrying out operations described herein. Moreover, the functionality of the MDM-IP of FIG. 1 and the hardware/software architecture of FIG. 2 may be implemented as a single processor system, a multi-processor system, a multi-core processor system, or even a network of stand-alone computer systems, in accordance with various embodiments.

Computer program code for carrying out operations of data processing systems and servers described above with respect to FIGS. 1 and 2, such as the MDM-IP 120, may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to flowchart and/or block diagram illustrations of methods, systems, and computer program products in accordance with exemplary embodiments. These flowchart and/or block diagrams further illustrate exemplary operations for intercepting and inspecting data as it is sent from a sending entity, such as an enterprise server 130 in an enterprise network 140, to one or more mobile devices 140a and 140b through a carrier network 160, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
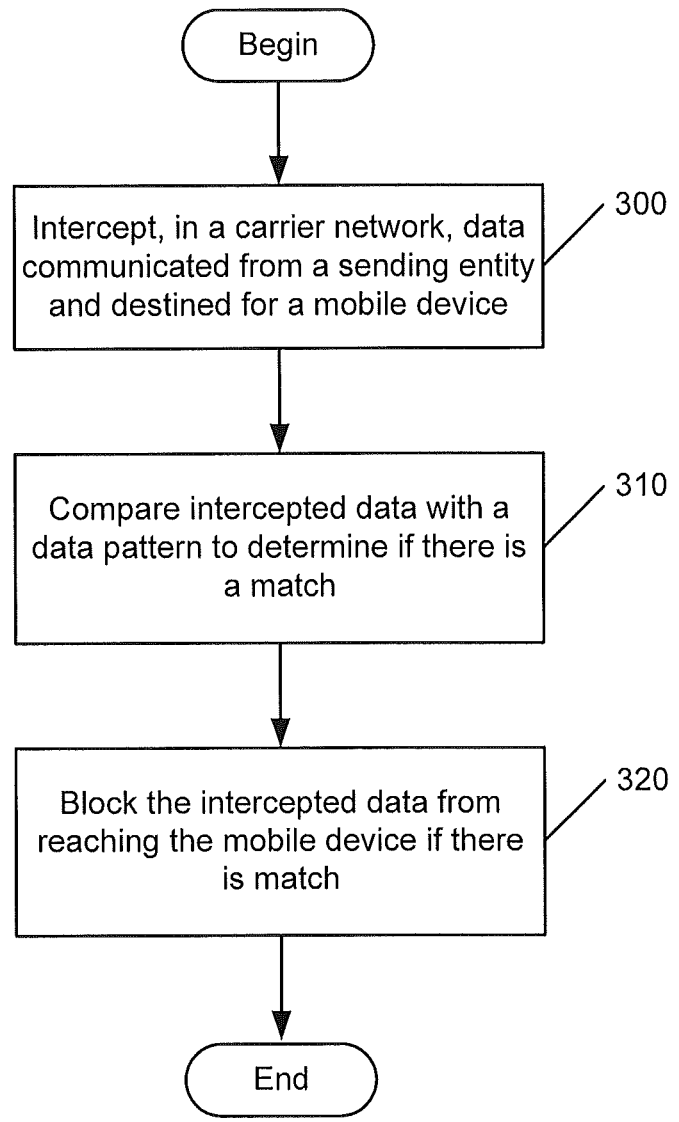
FIGS. 3 and 4 are flowcharts that illustrate operations of the MDM-IP for intercepting, in a carrier network, data destined for a mobile device to determine patterns in the data according to some embodiments.

Referring now to FIG. 3, exemplary operations for intercepting and inspecting data as it is sent from a sending entity to one or more mobile devices through a carrier network begin at block 300 where the MDM-IP 120 uses the matching engine 208 to intercept data sent from a sending entity, such as the enterprise server 130, to mobile device, such as one of the mobile devices 140a and 140b. At block 310, the matching engine 208 compares the intercepted data with one or more pre-defined data patterns 216 to determine if there is a match. If there is a match, the matching engine 208 blocks the intercepted data from reaching the intended destination mobile device at block 320. The sending entity, therefore, can protect certain types of data that are identifiable through patterns from being accessed through mobile devices, which may not contain the level of security that the enterprise desires.

Figure 4:
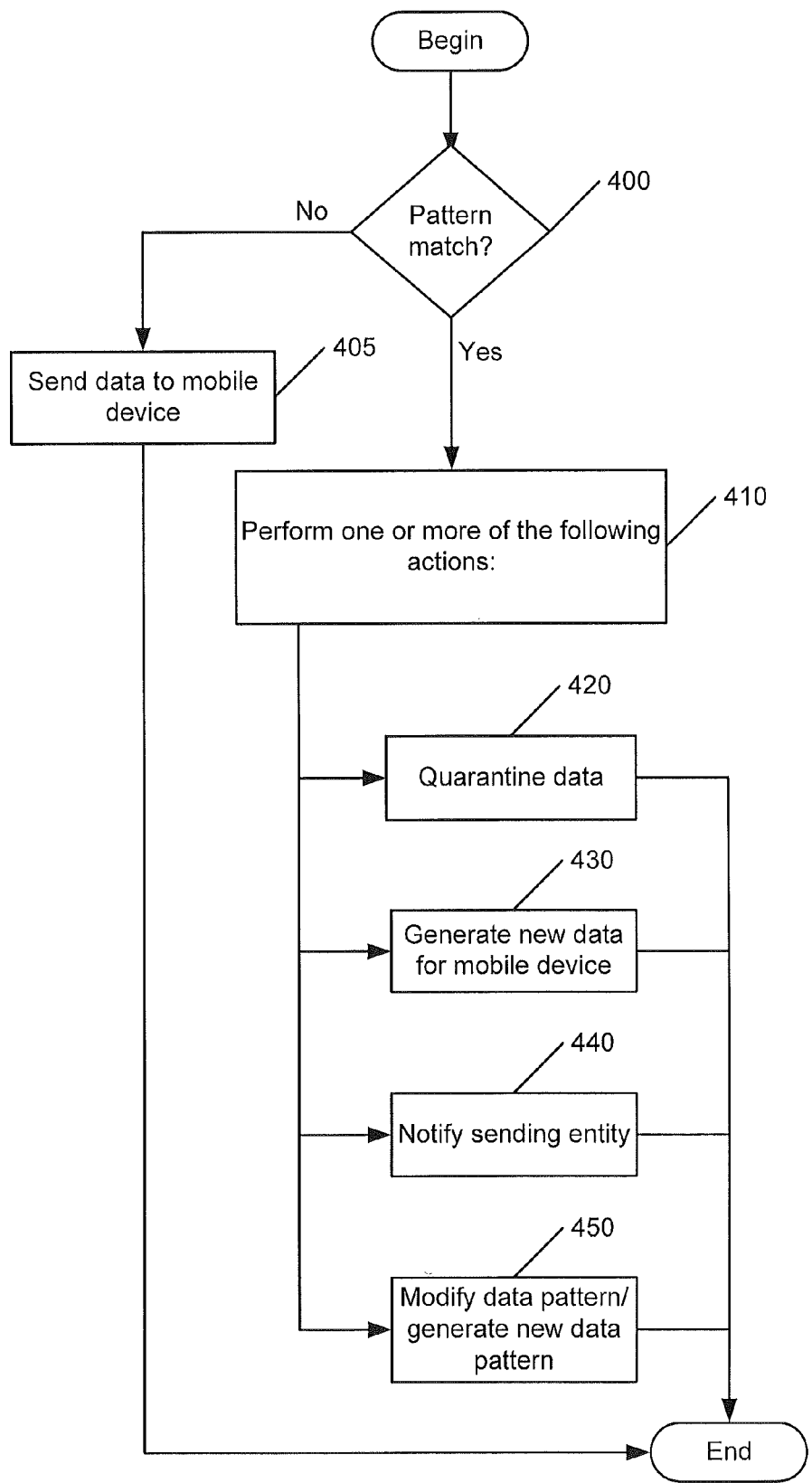

FIG. 4 is a flowchart that illustrates operations of the MDM-IP 120 in comparing the intercepted data with the data patterns 216 and actions taken in response thereto in further detail according to some embodiments. Operations begin at block 400 where the matching engine 208 determines whether data that has been intercepted from a sending entity (e.g., the enterprise server 130) to a mobile device (e.g., mobile device 140a, 140b) matches one or more of the pre-defined data patterns 216. If there is not a match, then the data is allowed to pass through the carrier network 160 for delivery to the destination mobile device at block 405. If the intercepted data does match one or more of the pre-defined data patterns 216, then the MDM-IP 120 performs one or more actions at block 410. One possible action is the MDM-IP 120 quarantines the intercepted data in the captured data module 214 for a period of time at block 420. Another possible action is that the MDM-IP 120 generates new data for the mobile device at block 430. The new data may be generated based on the intercepted data. For example, the new data may be generated by modifying or altering the intercepted data and the modified/altered data can then be sent to the destination mobile device. In other embodiments, the one or more data pattern(s) that the intercepted data matches may have a pre-defined response message associated therewith that can be sent to the destination mobile device.

Still another possible action is that the MDM-IP 120 notifies the sending entity (e.g., the enterprise customer) at block 440 that a mobile device has attempted to access enterprise data and the data has been intercepted in the carrier network 160 due to the data matching one or more pre-defined data patterns 216. In accordance with various embodiments, the enterprise can be notified using a SMS message and/or VoIP packets that may also include a portion or all of the intercepted data.

Still another possible action is that the MDM-IP 120 modifies one or more of the data patterns and/or generates new data patterns based on input received from the sending entity (e.g., the enterprise customer) and/or observing actions taken by the sending entity. For example, the knowledge engine module 212 may observe that a security administrator for the sending entity re-sends a portion of intercepted data that was blocked by the MDM-IP 120 so as not to be caught by one or more of the pre-defined data patterns 216. The knowledge engine module 212 may, in response to this observation, modify one or more of the pre-defined data patterns to so that only the portion of data that the sending entity wishes to be blocked is blocked and the remaining data is allowed to reach the destination mobile device.

The flowcharts of FIGS. 3 and 4 illustrate the architecture, functionality, and operations of some embodiments of methods, systems, and computer program products for intercepting, in a carrier network, data destined for a mobile device to determine patterns in the data. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and 4. For example, two blocks shown in succession may, in fact, be executed substantially concurrently or the blocks may sometimes be executed in the reverse order, depending on the functionality involved.

According to some embodiments described above, an operator of a carrier network may incorporate and MDM-IP to intercept enterprise data, for example, that a mobile device is attempting to access. The MDM-IP is configured to use pre-defined data patterns to act as a type of filter to block certain data from reaching the mobile device while allowing other data to pass through the carrier network and reach the mobile device. The enterprise may provide input to configure the pre-defined data patterns to control what data is accessible to mobile devices and what data is restricted from access via a mobile device. In addition, the MDM-IP may learn new data patterns to restrict based on actions by and/or direct input from the enterprise. The MDM-IP may also communicate with the enterprise to notify the enterprise that certain data has been intercepted and blocked from reaching a mobile device using, for example, a short message service center (SMSC), a mobile switching center (MSC), Signaling System 7 (SS7) networks, and the like.

Many variations and modifications can be made to the preferred embodiments without substantially departing from the principles of the present invention. All such variations and modifications are intended to be included herein within the scope of the present invention, as set forth in the following claims.

That which is claimed:

1. A method, comprising:
   intercepting, in a carrier network, data communicated from a sending entity and destined for a mobile device;
   comparing the data that has been intercepted with a data pattern to determine whether the data that has been intercepted matches the data pattern;
   blocking the data that has been intercepted from reaching the mobile device when the data that has been intercepted matches the data pattern;
   notifying the sending entity that the data that has been intercepted has been blocked from reaching the mobile device; and
   modifying the data pattern responsive to action taken by the sending entity responsive to the sending entity being notified that the data that has been intercepted has been blocked from reaching the mobile device.

2. The method of claim 1, further comprising:
   quarantining the data that has been intercepted for a defined time period when the data that has been intercepted matches the data pattern.

3. The method of claim 1, wherein the data that has been intercepted comprises first data, the method further comprising:
   generating second data based on the first data; and
   sending the second data to the mobile device.

4. The method of claim 3, wherein generating the second data comprises changing the first data in a pre-defined way associated with the data pattern.

5. The method of claim 3, wherein the second data comprises a pre-defined response that is associated with the data pattern.

6. The method of claim 1, wherein notifying the sending entity comprises:
   sending a short message service message to a security administrator associated with the sending entity.

7. The method of claim 6, wherein the short message service message comprises a portion of the data that has been intercepted.

8. The method of claim 1, wherein notifying the sending entity comprises:
   sending voice over internet protocol packets to a security administrator associated with the sending entity.

9. The method of claim 8, wherein the voice over internet protocol packets comprise a portion of the data that has been intercepted.

10. The method of claim 1, further comprising:
    generating the data pattern responsive to input from the sending entity.

11. A system, comprising:
    a processor; and
    a memory coupled to the processor and comprising computer readable program code embodied in the memory that when executed by the processor causes the processor to perform operations comprising:
    intercepting, in a carrier network, data communicated from a sending entity and destined for a mobile device;
    comparing the data that has been intercepted with a data pattern to determine whether the data that has been intercepted matches the data pattern;
    blocking the data that has been intercepted from reaching the mobile device when the data that has been intercepted matches the data pattern;
    notifying the sending entity that the data that has been intercepted has been blocked from reaching the mobile device; and
    modifying the data pattern responsive to action taken by the sending entity responsive to the sending entity being notified that the data that has been intercepted has been blocked from reaching the mobile device.

12. The system of claim 11, wherein the operations further comprise:
    quarantining the data that has been intercepted for a defined time period when the data that has been intercepted matches the data pattern.

13. The system of claim 11, wherein the data that has been intercepted comprises first data, the operations further comprising:
    generating second data based on the first data; and
    sending the second data to the mobile device.

14. The system of claim 13, wherein the operations further comprise generating the second data by changing the first data in a pre-defined way associated with the data pattern.

15. The system of claim 11, wherein the operations further comprise notifying the sending entity by sending a short message service message to a security administrator associated with the sending entity.

16. The system of claim 11, wherein the operations further comprise notifying the sending entity by sending voice over internet protocol packets to a security administrator associated with the sending entity.

17. An article of manufacture, comprising:
    a non-transitory computer readable storage medium comprising instructions, which, when loaded and when executed by a processor, cause the processor to perform operations comprising:
    intercepting, in a carrier network, data communicated from a sending entity and destined for a mobile device;
    comparing the data that has been intercepted with a data pattern to determine whether the data that has been intercepted matches the data pattern;
    blocking the data that has been intercepted from reaching the mobile device when the data that has been intercepted matches the data pattern;
    notifying the sending entity that the data that has been intercepted has been blocked from reaching the mobile device; and
    modifying the data pattern responsive to action taken by the sending entity responsive to the sending entity being notified that the data that has been intercepted has been blocked from reaching the mobile device.

18. The article of manufacture of claim 17, wherein the operations further comprise:
quarantining the data that has been intercepted for a defined time period when the data that has been intercepted matches the data pattern.

19. The article of manufacture of claim 17, wherein the data that has been intercepted comprises first data, the operations further comprising:
generating second data based on the first data; and
sending the second data to the mobile device.

20. The article of manufacture of claim 19, wherein the operations further comprise generating the second data by changing the first data in a pre-defined way associated with the data pattern.

* * * * *